(12) United States Patent
Sugimura et al.

(10) Patent No.: US 12,525,373 B2
(45) Date of Patent: Jan. 13, 2026

(54) ELECTRICALLY CONDUCTIVE WIRE

(71) Applicant: Sumitomo Electric Industries, Ltd., Osaka (JP)

(72) Inventors: Kazuaki Sugimura, Osaka (JP);
Takayuki Shiwaku, Osaka (JP);
Tomoyuki Awazu, Osaka (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 258 days.

(21) Appl. No.: 18/024,284

(22) PCT Filed: Jul. 28, 2022

(86) PCT No.: PCT/JP2022/029198
§ 371 (c)(1),
(2) Date: Mar. 2, 2023

(87) PCT Pub. No.: WO2023/013523
PCT Pub. Date: Feb. 9, 2023

(65) Prior Publication Data
US 2024/0029914 A1  Jan. 25, 2024

(30) Foreign Application Priority Data

Aug. 6, 2021 (JP) ................................. 2021-130221
May 31, 2022 (JP) ................................. 2022-088815

(51) Int. Cl.
*H01B 1/02* (2006.01)

(52) U.S. Cl.
CPC .................................. *H01B 1/026* (2013.01)

(58) Field of Classification Search
None
See application file for complete search history.

(56) References Cited

U.S. PATENT DOCUMENTS 4,537,808 A   8/1985   Yamamoto et al.

FOREIGN PATENT DOCUMENTS

| JP | 59-205105 A | 11/1984 |
| JP | 11-250739 A | 9/1999 |
| JP | 2007061897 A * | 3/2007 |
| JP | 2010-520612 A | 6/2010 |
| JP | 4868304 B2 | 2/2012 |
| JP | 2018-37324 A | 3/2018 |
| WO | 2008/109817 A1 | 9/2008 |
| WO | 2010/129293 A2 | 11/2010 |

OTHER PUBLICATIONS

Machine translation of JP2007061897A via EPO, translated Jan. 10, 2025 (Year: 2007).*

* cited by examiner

*Primary Examiner* — Elizabeth Collister
(74) *Attorney, Agent, or Firm* — McCarter & English, LLP; Michael A. Sartori (57) ABSTRACT

An electrically conductive wire includes a core wire made of metal, and a coating layer made of stainless steel covering a surface of the core wire. The metal constituting the core wire has an electrical conductivity greater than that of the stainless steel. The core wire includes a diffusion layer containing not less than 0.5 mass % Fe, arranged to constitute the surface of the core wire. The diffusion layer has a thickness that is not less than 0.4% and not more than 5% of the diameter of the core wire.

4 Claims, 3 Drawing Sheets

ELECTRICALLY CONDUCTIVE WIRE

TECHNICAL FIELD

The present disclosure relates to an electrically conductive wire.

The present application claims priority based on Japanese Patent Application No. 2021-130221 filed on Aug. 6, 2021, and Japanese Patent Application No. 2022-88815 filed on May 31, 2022, the entire contents of which are incorporated herein by reference.

BACKGROUND ART

As a material constituting an electrically conductive wire, a copper (Cu) alloy containing 0.2 to 2 mass % beryllium (Be), a Be—Cu alloy (hereinafter, also referred to as Be—Cu), is known. While being high in strength, Be—Cu has problems including expensiveness due to Be contained therein. As electrically conductive wires that do not contain Be, electrically conductive wires that include a core wire made of Cu and a coating layer made of stainless steel covering the surface of the core wire are known (see, for example, Japanese Patent Application Laid-Open No. S59-205105 (Patent Literature 1) and International Publication WO 2010/129293 (Patent Literature 2)).

CITATION LIST

Patent Literature

Patent Literature 1: Japanese Patent Application Laid-Open No. S59-205105
Patent Literature 2: International Publication WO 2010/129293

SUMMARY OF INVENTION

An electrically conductive wire according to the present disclosure includes a core wire made of metal, and a coating layer made of stainless steel covering a surface of the core wire. The metal constituting the core wire has an electrical conductivity greater than an electrical conductivity of the stainless steel. The core wire includes a diffusion layer containing not less than 0.5 mass % iron (Fe), arranged to constitute the surface of the core wire. The diffusion layer has a thickness that is not less than 0.4% and not more than 5% of a diameter of the core wire.

DESCRIPTION OF EMBODIMENTS

Problems to be Solved by Present Disclosure

Electrically conductive wires may be required to have not only sufficient conductivity and strength but also durability against repeated bending fatigue, as in the case of being used in moving parts of equipment. The electrically conductive wire disclosed in Patent Literature 1 above tends to show a low percentage reduction of area in a tensile test. A lower percentage reduction of area means a higher work hardening rate, and a high work hardening rate reduces the durability against repeated bending fatigue.

For the strength (tensile strength) as well, it cannot necessarily be said to be higher than that of Be—Cu, and the wire cannot be said to be superior in terms of strength.

In view of the foregoing, one of the objects is to provide an electrically conductive wire that has higher strength than Be—Cu, while securing electrical conductivity comparable to that of Be—Cu, and is excellent in durability against repeated bending fatigue.

Advantageous Effects of Present Disclosure

According to the electrically conductive wire described above, it is possible to provide an electrically conductive wire that is higher in strength than Be—Cu, with electrical conductivity comparable to that of Be—Cu being secured, and excellent in durability against repeated bending fatigue.

Description of Embodiments of Present Disclosure

First, embodiments of the present disclosure will be listed and described. The electrically conductive wire of the present disclosure includes: a core wire made of metal; and a coating layer made of stainless steel covering a surface of the core wire. The metal constituting the core wire has an electrical conductivity greater than that of the stainless steel. The core wire includes a diffusion layer containing not less than 0.5 mass % Fe, arranged to constitute the surface of the core wire. The diffusion layer has a thickness that is not less than 0.4% and not more than 5% of a diameter of the core wire.

The present inventors investigated the reasons why electrically conductive wires higher in strength than Be—Cu and excellent in durability against repeated bending fatigue could not be obtained with the electrically conductive wires in which a core wire high in electrical conductivity is covered with a stainless steel coating layer, including the electrically conductive wire disclosed in Patent Literature 1 above. As a result, the inventors found that the diffusion layer (a layer containing 0.5 mass % or more Fe) formed near the surface of the core wire by Fe diffusing from the coating layer to near the surface of the core wire affects the durability against repeated bending fatigue and the strength.

In other words, in the state where the diffusion layer is not formed and in the state where the thickness of the diffusion layer is less than 0.4% of the diameter of the core wire, the electrically conductive wire is low in durability against repeated bending fatigue. This can be considered to be because when the electrically conductive wire is bent, for example, the deformation of one of the coating layer and the core wire does not sufficiently follow the deformation of the other, causing the strain to be concentrated in the coating layer.

On the other hand, in the state where the thickness of the diffusion layer exceeds 5% of the diameter of the core wire, the strength of the electrically conductive wire becomes low. This can be considered to be because the diffusion layer, despite being included in the core wire made of a highly conductive material, has electrical conductivity that is substantially much smaller than in the region of the core wire other than the diffusion layer. This creates a need to increase the area fraction of the core wire in the cross section perpendicular to the longitudinal direction of the electrically conductive wire in order to secure the electrical conductivity comparable to that of Be—Cu. As a result, the area fraction of the stainless steel coating layer, which contributes to strength improvement, becomes relatively small, resulting in lower strength.

In the electrically conductive wire of the present disclosure, the thickness of the diffusion layer is set to be not less than 0.4% and not more than 5% of the diameter of the core wire. Setting the thickness of the diffusion layer to be 0.4% or more of the diameter of the core wire improves the durability against repeated bending fatigue. On the other hand, setting the thickness of the diffusion layer to be 5% or less of the diameter of the core wire can secure sufficient thickness of the coating layer, facilitating obtaining a strength comparable to or higher than that of Be—Cu. As such, according to the electrically conductive wire of the present disclosure, it is possible to provide an electrically conductive wire that is higher in strength than Be—Cu, with electrical conductivity comparable to that of Be—Cu being secured, and is excellent in durability against repeated bending fatigue.

Here, the diameter of the core wire means an equivalent circle diameter of the core wire in a cross section perpendicular to the longitudinal direction of the electrically conductive wire. In the case where the core wire in this cross section is circular, the equivalent circle diameter is the diameter of the core wire. In the case where the core wire in the cross section has a shape other than a circle, the equivalent circle diameter is the diameter of a circle corresponding to the area of the core wire. The thickness of the diffusion layer can be measured, for example, by line analysis using an electron probe micro analyzer (EPMA). Specifically, the electrically conductive wire is first cut in a cross section perpendicular to the longitudinal direction. The concentration of Fe near the interface between the core wire and the coating layer in the cross section is examined by conducting line analysis in the direction perpendicular to the interface. Then, the thickness of a portion in which the Fe content is 0.5 mass % or more can be determined to be the thickness of the diffusion layer.

In the above-described electrically conductive wire, the thickness of the diffusion layer may be not less than 0.85% of the diameter of the core wire. With this configuration, settling resistance to static deformation can be improved.

In the above-described electrically conductive wire, the core wire may be composed of at least one of Cu, silver (Ag), aluminum (Al), Cu alloy, Ag alloy, and Al alloy. These materials have high electrical conductivity, so they are suitable as materials constituting the core wire.

In the above-described electrically conductive wire, the core wire may be composed of Cu. Cu costs low among the materials having high electrical conductivity, so it is particularly suitable as a material constituting the core wire.

In the above-described electrically conductive wire, the stainless steel may be an austenitic stainless steel. An austenitic stainless steel, having sufficient workability, is suitable as a stainless steel constituting the coating layer.

In the above-described electrically conductive wire, the core wire may be composed of Cu. The stainless steel may be JIS (Japanese Industrial Standards) SUS304. A maximum value of a change in modulus of elasticity when the modulus of elasticity is measured in a cross section perpendicular to the longitudinal direction of the electrically conductive wire at intervals of 0.5 μm across the interface between the core wire and the coating layer in a direction perpendicular to the interface may be not less than 1500 GPa and not more than 16250 GPa. Cu and SUS304 are particularly suitable as materials constituting the core wire and the coating layer, respectively. Satisfying the above conditions on the modulus of elasticity makes it possible to achieve both improved settling resistance to static deformation and high electrical conductivity.

Details of Embodiments of Present Disclosure

An embodiment of the electrically conductive wire of the present disclosure will be described below with reference to the drawings. In the drawings referenced below, the same or corresponding portions are denoted by the same reference numerals and the description thereof will not be repeated.

Figure 1:
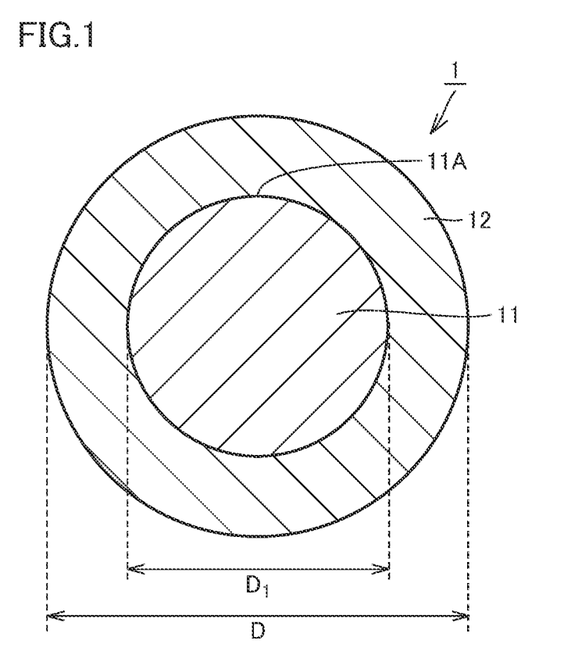
FIG. 1 is a schematic cross-sectional diagram showing a cross section of an electrically conductive wire perpendicular to the longitudinal direction thereof.

Referring to FIG. 1, the electrically conductive wire 1 in the present embodiment includes a core wire 11 and a coating layer 12. The core wire 11 is made of metal. The coating layer 12 is made of stainless steel. The coating layer 12 covers a surface (outer peripheral surface) 11A of the core wire 11. The metal constituting the core wire 11 has an electrical conductivity greater than that of the stainless steel constituting the coating layer 12.

The core wire 11 is preferably composed of a metal with excellent conductivity. The core wire 11 is composed, for example, of at least one of Cu, Ag, Al, Cu alloy, Ag alloy, and Al alloy (Cu (pure copper), for example). The shape of the core wire 11 in a cross section perpendicular to the longitudinal direction is, although not particularly limited, circular in the present embodiment, as shown in FIG. 1. The shape of the core wire 11 in the cross section perpendicular to the longitudinal direction may be a shape other than the circle, such as an oval shape, for example.

In a cross section perpendicular to the longitudinal direction, the coating layer 12 has a shape that follows the outer peripheral surface of the core wire 11. In the present embodiment, the coating layer 12 has a hollow cylindrical shape. In the cross section perpendicular to the longitudinal direction, the coating layer 12 has a constant thickness. The stainless steel constituting the coating layer 12 may be, for example, JIS SUS304, SUS316, or other austenitic stainless steel excellent in workability and corrosion resistance (SUS304, for example).

Referring to FIG. 1, an outer diameter D (wire diameter) of the electrically conductive wire 1 is, although not particularly limited, not less than 10 lam and not more than 60 mm, for example. The outer diameter D of the electrically conductive wire 1 may be 20 μm or more. The outer diameter D of the electrically conductive wire 1 may be 30 mm or less, or 10 mm or less. In the cross section perpendicular to the longitudinal direction, the proportion of the cross-sectional area of the core wire 11 with respect to the cross-sectional area of the electrically conductive wire 1, which can be determined as appropriate in consideration of the required strength and conductivity, may be not less than 10% and not more than 90%, for example. The proportion of the cross-sectional area of the core wire 11 with respect to the cross-sectional area of the electrically conductive wire 1 may be 15% or more, or even 20% or more. The proportion of the cross-sectional area of the core wire 11 with respect to the cross-sectional area of the electrically conductive wire 1 may be 85% or less, 80% or less, or even 75% or less.

Figure 2:
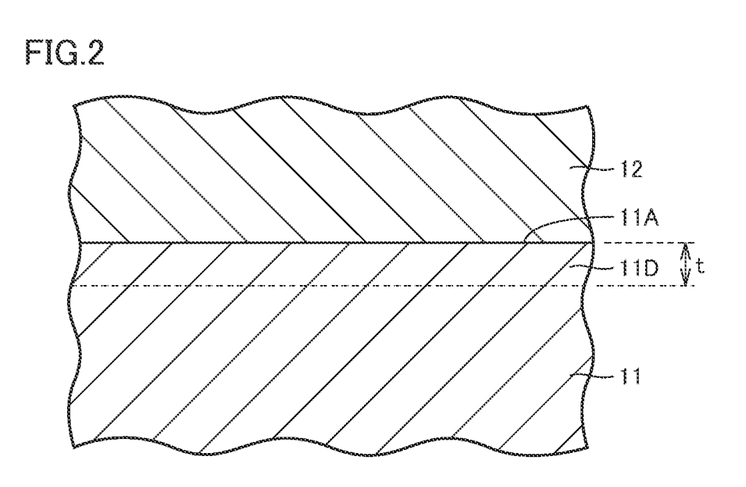
FIG. 2 is a schematic cross-sectional diagram showing the structure near an interface between a core wire and a coating layer.

Referring to FIG. 2, the core wire 11 includes a diffusion layer 11D containing mass % or more Fe, arranged to constitute the surface 11A of the core wire 11. Referring to FIGS. 2 and 1, the diffusion layer 11D has a thickness t that is not less than and not more than 5% of a diameter $D_1$ of the core wire 11. The thickness t of the diffusion layer 11D is more preferably 0.7% or more, 0.85% or more, or even 1% or more of the diameter $D_1$ of the core wire 11. The thickness t of the diffusion layer 11D is more preferably not more than 4% of the diameter $D_1$ of the core wire 11.

Figure 3:
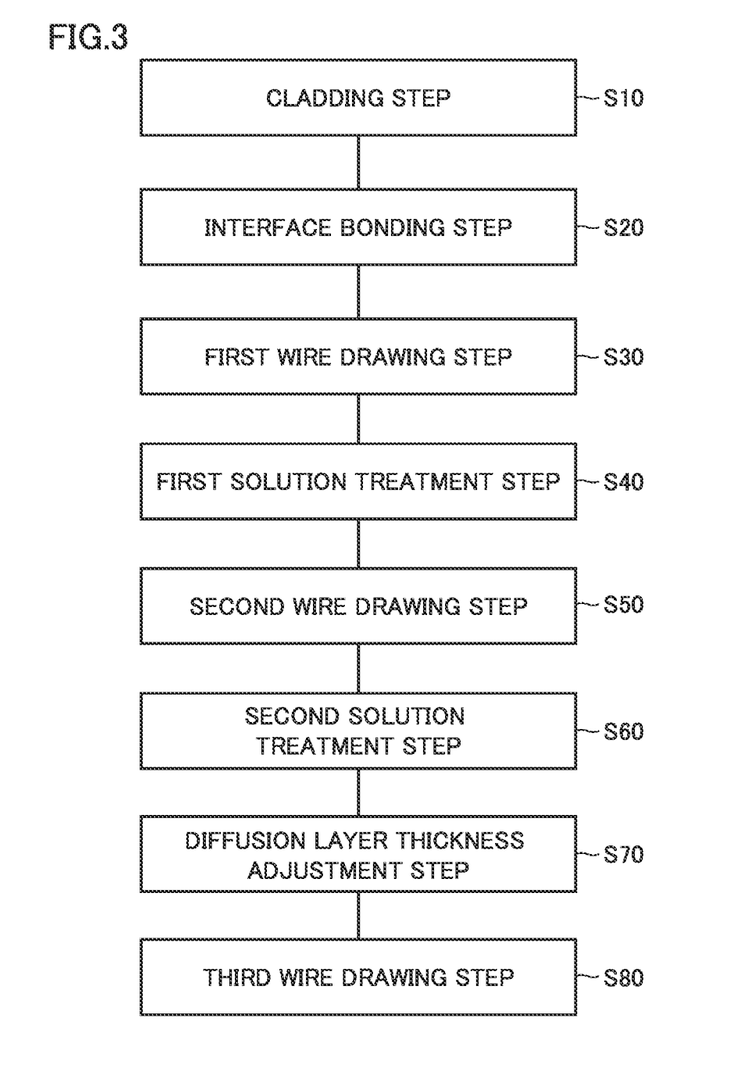
FIG. 3 is a flowchart illustrating an outline of a method for producing an electrically conductive wire.

An exemplary method for producing the electrically conductive wire 1 will now be described. Referring to FIG. 3, in the method for producing the electrically conductive wire 1 in the present embodiment, a cladding step is first performed as a step S10. In this step S10, a stainless steel pipe of a hollow cylindrical shape, which is to be the coating layer 12, and a metal rod, to be the core wire 11, are prepared first. In the present embodiment, a pipe made of JIS SUS304, which is an austenitic stainless steel, and a rod made of oxygen-free copper (pure Cu) are prepared. The rod is then inserted into the pipe to obtain a clad material with the metal rod made of copper inserted in the tube made of stainless steel. In the present embodiment, the pipe has an outer diameter of 4.91 mm.

Next, an interface bonding step is performed as a step S20. In this step S20, the interface between the pipe and the rod constituting the clad material produced in step S20 is bonded. Specifically, wire drawing (drawing process) is performed on the clad material obtained in step S10 at a relatively small rate of work (reduction of area). Specifically, with the wire drawing, the outer diameter of the clad material is made to be 3 mm. Thereafter, heat treatment is conducted to bond the interface between the pipe and the rod constituting the clad material. The heat treatment can be performed under the conditions of, for example, heating the material to 950° C. or more and 1050° C. or less and keeping it for about one minute to about ten minutes.

Next, a first wire drawing step is performed as a step S30. In this step S30, wire drawing is performed on the clad material with the interface between the pipe and the rod bonded in step S20. Specifically, in the present embodiment, the wire drawing is performed to achieve an outer diameter of the clad material of 1.88 mm. The wire drawing is performed by passing the clad material through a through hole formed in a die. The wire drawing may be done in a single process using a single die or in a plurality of processes using a plurality of dies. As a result, an electrically conductive wire 1 with an outer diameter D of 1.88 mm is obtained. The rod described above becomes the core wire 11 and the pipe described above becomes the coating layer 12.

Next, a first solution treatment step is performed as a step S40. In this step S40, solution treatment is performed on the wire with the outer diameter D of 1.88 mm obtained in step S30. Specifically, the electrically conductive wire 1 obtained in step S30 is subjected to heat treatment in which, for example, the wire is heated to a temperature range of not lower than 900° C. and not higher than 1100° C., and held for a period of not shorter than five seconds and not longer than 20 minutes before being rapidly cooled. With this treatment, in the metallographic structure of the stainless steel that constitutes the coating layer 12, the crystal grains elongated by the wire drawing in step S30 are recrystallized, and the martensitic structure produced with the wire drawing disappears. As a result, the coating layer 12 that was work-hardened in step S30 softens and attains a state ready for another wire drawing process. The heating temperature in the solution treatment is preferably not lower than the $A_{C3}$ point of the stainless steel that constitutes the coating layer. The $A_{C3}$ point of the stainless steel can be calculated using, for example, the following formula: 937.2−436.5×(C %)+56×(Si %)−19.7×(Mn %)−16.3×(Cu %)−26.6×(Ni %)−4.9×(Cr %)+38.1×(Mo %)+124.8×(V %)+136.3×(Ti %)−19.1×(Nb %)+198.4×(Al %)+3315×(B %) (unit: ° C.). Here, (C %), (Si %), (Mn %), (Cu %), (Ni %), (Cr %), (Mo %), (V %), (Ti %), (Nb %), (Al %), and (B %) refer to the content (percentage) of carbon (C), silicon (Si), manganese (Mn), copper (Cu), nickel (Ni), chromium (Cr), molybdenum (Mo), vanadium (V), titanium (Ti), niobium (Nb), aluminum (Al), and boron (B), respectively, contained in the stainless steel. In the case where the stainless steel constituting the coating layer is an austenitic stainless steel such as JIS SUS304, the heating temperature in the solution treatment is preferably 900° C. or higher, and more preferably 950° C. or higher.

With the solution treatment, Fe and nickel (Ni) contained in the stainless steel constituting the coating layer 12 diffuse into the core wire 11. As a result, the diffusion layer 11D containing 0.5 mass % or more Fe is formed (see FIG. 2). The Ni content in the diffusion layer 11D is, for example, 0.2 mass %. In the electrically conductive wire 1 of the present embodiment, the thickness t of the diffusion layer 11D is required to be not less than 0.4% and not more than 5% of the diameter $D_1$ of the core wire 11, and preferably not less than 0.85% and not more than 5%. The thickness t of the diffusion layer 11D is mainly adjusted in a diffusion layer thickness adjustment step S70, which will be described later. However, the diffusion of Fe from the coating layer 12 to the core wire 11 due to the solution treatment also affects the thickness t of the diffusion layer 11D. Therefore, it is necessary to determine the conditions of the solution treatment in this step S40, taking also account of the conditions of wire drawing and solution treatment in the subsequent steps. The diffusion rate (diffusion length per unit time) of Fe (and Ni) accelerates as the heating temperature in the solution treatment becomes higher. The heating temperature and the heating time are determined in consideration of production efficiency and ease of control of the thickness t of the diffusion layer 11D.

Next, a second wire drawing step is performed as a step S50. In this step S50, wire drawing is performed on the electrically conductive wire 1 that has undergone the solution treatment in step S40. Specifically, in the present embodiment, the wire drawing is performed to achieve an outer diameter D of the electrically conductive wire 1 of 0.7 mm. As in the case of step S30, the wire drawing may be performed in a single process using a single die or in a plurality of processes using a plurality of dies. With this, an electrically conductive wire 1 with the outer diameter D of 0.7 mm is obtained.

Next, a second solution treatment step is performed as a step S60. In this step S60, solution treatment is performed on the wire with the outer diameter D of 0.7 mm obtained in step S50. Specifically, the electrically conductive wire 1 obtained in step S50 is subjected to heat treatment in which, for example as in step S40, the wire is heated to a temperature range of not lower than 900° C. and not higher than 1100° C., held for a period of not shorter than five seconds and not longer than 20 minutes, and then rapidly cooled. With this, as in the case of step S40, the crystal grains of the stainless steel constituting the coating layer 12 are recrystallized and the martensitic structure disappears. As a result, the coating layer 12 that was work-hardened in step S50 softens and attains a state ready for another wire drawing process.

With the solution treatment, the diffusion layer 11D is formed, as in the case of step S40. Unlike the step S40 that is subsequently followed by two wire drawing steps and one solution treatment step, the step S60 has a significant effect on the proportion of the thickness t of the diffusion layer 11D with respect to the diameter $D_1$ of the core wire 11. This is because the diffusion layer 11D formed in step S40 is reduced in thickness through the two wire drawing processes in steps S50 and S70. In order to set the thickness t of the diffusion layer 11D within the narrow range of not less than 0.4% and not more than 5% (or further, not less than 0.85% and not more than 5%) of the diameter $D_1$ of the core wire 11, it is necessary to determine the conditions of the solution treatment in this step S60 in consideration of facilitating the adjustment of the thickness t of the diffusion layer 11D in a diffusion layer thickness adjustment step S70 described below.

Next, the diffusion layer thickness adjustment step is performed as a step S70. In this step S70, heat treatment for adjusting the thickness t of the diffusion layer 11D is performed on the electrically conductive wire 1 that has undergone the solution treatment in step S60. Specifically, the heat treatment is conducted in which the wire is heated to a temperature range of not lower than 800° C. and not higher than 1100° C., and held for a period of not shorter than five seconds and not longer than 20 minutes before being rapidly cooled. In order to set the thickness t of the diffusion layer 11D within the narrow range of not less than 0.4% and not more than 5% (or further, not less than 0.85% and not more than 5%) of the diameter $D_1$ of the core wire 11, it is necessary to strictly control the diffusion length of Fe. Selecting a lower heating temperature with which the diffusion rate of Fe is smaller and increasing the range of allowable heating time, while allowing a certain degree of reduction in production efficiency, facilitates formation of the diffusion layer 11D with an appropriate thickness. It should be noted that this step S70 is not an essential step and can be omitted by setting appropriate conditions for the solution treatment in steps S40 and S60. However, performing the step S70, while keeping the thickness t of the diffusion layer 11D formed in steps S40 and S60 sufficiently small, facilitates setting the thickness t of the diffusion layer 11D within the narrow range of not less than 0.4% and not more than 5% (or further, not less than 0.85% and not more than 5%) of the diameter $D_1$ of the core wire 11.

Next, a third wire drawing step is performed as a step S80. In this step S80, wire drawing is performed on the electrically conductive wire 1 for which the thickness t of the diffusion layer 11D has been adjusted in step S70. Specifically, in the present embodiment, the wire drawing is performed to achieve an outer diameter D of 0.3 mm for the electrically conductive wire 1. The wire drawing may be performed in a single process using a single die or in a plurality of processes using a plurality of dies, as in steps S30 and S50. With this, an electrically conductive wire 1 that has the outer diameter D of 0.3 mm and in which the thickness t of the diffusion layer 11D is not less than 0.4% and not more than 5% (or further, not less than 0.85% and not more than 5%) of the diameter $D_1$ of the core wire 11 is completed.

According to the above-described method for producing an electrically conductive wire in the present embodiment, the electrically conductive wire 1 of the present embodiment can readily be produced.

EXAMPLES (1) Evaluation of Durability Against Repeated Bending Fatigue

An experiment was conducted to confirm that the formation of a diffusion layer improves the durability against repeated bending fatigue. Electrically conductive wires 1 with an outer diameter D of 0.3 mm were prepared using the production method described in the above embodiment, and a repeated bending fatigue test was conducted. The thickness t of the diffusion layer 11D relative to the diameter $D_1$ of the core wire 11 was varied within the range of 0.4% to 5% by varying the heating temperature and heating time in step S70. For comparison, the heating temperature and heating time in step S70 were further varied to also prepare samples having the thickness t of the diffusion layer 11D relative to the diameter $D_1$ of the core wire 11 falling outside the range of 0.4% to 5%. The resulting electrically conductive wires 1 were then subjected to the repeated bending fatigue test. For each electrically conductive wire 1, the action of bending the wire by 90° from the straight state, returning it to the straight state, and then bending it to the opposite side by 90° was repeated, and the number of cycles until the maximum bending strain amount became 0.5% or more (the number of times of endurance) was measured. The maximum bending strain amount is an amount expressed as $D/(D+2R) \times 100\%$, where D is the wire diameter and R is the bending curvature. Then, it was judged to be acceptable if the number of times of endurance was $200 \times 10^3$ times or more. The results of the experiment are shown in Table 1.

TABLE 1

| | Diffusion Layer Thickness Adjustment | | | Number of Times of | |
|---|---|---|---|---|---|
| | Temperature (° C.) | Time (sec) | $t/D_1$ (%) | Endurance ($\times 10^3$ times) | Judgment |
| Sample A | 850 | 6 | 0.36 | 70 | Unacceptable |
| Sample B | 800 | 23 | 0.40 | 222 | Acceptable |
| Sample C | 950 | 60 | 2.04 | 850 | Acceptable |
| Sample D | 1030 | 600 | 9.23 | 500 | Acceptable |

In Table 1, Samples B and C for which $t/D_1$, the percentage of the thickness t of the diffusion layer 11D with respect to the diameter $D_1$ of the core wire 11, is within the range of 0.4% to 5% are examples of the electrically conductive wire of the present disclosure. On the other hand, Samples A and D for which $t/D_1$ is outside the range of 0.4% to 5% are comparative examples. As shown in Table 1, Samples B to D are acceptable in terms of durability against repeated bending fatigue, while Sample A is unacceptable. Focusing on Sample A and Sample B, the number of times of endurance increased to more than three folds despite only a slight increase in the value of $t/D_1$ from 0.36 to 0.40. This confirms that setting the value of $t/D_1$ to 0.4 or higher is very important in improving the durability against repeated bending fatigue.

(2) Evaluation of Effect of Diffusion Layer on Electrical Conductivity

Experiments were conducted to confirm the effect of the formation of a diffusion layer on electrical conductivity. For Samples C and D in (1) above, the production process was temporarily stopped in the state where up to step S20 was completed (in the state with the outer diameter D of 3 mm), and the electrical conductivity of the clad material and the area fraction of the copper core wire 11 in the cross section perpendicular to the longitudinal direction were measured. As a result, the area fraction of the copper core wire 11 in the cross section perpendicular to the longitudinal direction was 33%. The electrical conductivity was 32.1% IACS (International Annealed Copper Standard). From the foregoing, it can be said that the electrical conductivity corresponding approximately to the area fraction of the copper core wire 11 has been acquired at the stage of step S20.

Next, tensile strength and electrical conductivity were measured for Samples C and D in (1) above that were completed by performing up to step S80. For comparison, tensile strength and electrical conductivity were also measured in the same manner for a sample having the same outer diameter (0.3 mm) as Samples C and D and made of Be—Cu. The experimental results are shown in Table 2.

TABLE 2

|  | Diffusion Layer Thickness Adjustment | | Tensile | Electrical |
|---|---|---|---|---|
|  | Temperature (° C.) | Time (sec) | Strength (MPa) | Conductivity (% IACS) |
| Sample C | 950 | 60 | 1513 | 31.8 |
| Sample D | 1030 | 600 | 1417 | 18.4 |
| Be—Cu | — | — | 1391 | 23.9 |

As shown in Table 2, tensile strength is higher in both Samples C and D than in Be—Cu. On the other hand, while electrical conductivity is higher in Sample C than in Be—Cu, it is lower in Sample D than in Be—Cu.

Here, in order to confirm that the difference in electrical conductivity between Sample C and Sample D is not due to a change in the area fraction of the core wire 11 in the cross section perpendicular to the longitudinal direction, the area fraction was measured each time the wire drawing process included in the production method of Samples C and D was performed. The measurement results are shown in Table 3.

TABLE 3

| Outer Diameter D (mm) | 4.91 | 3 | 1.88 | 0.3 |
|---|---|---|---|---|
| Area Fraction of Core Wire (%) | 33.4 | 30.3 | 34.3 | 33.8 |

For both Samples C and D, the area fraction of the core wire 11 was as shown in Table 3. In the state of having the outer diameter D of 0.3 mm when the electrical conductivity was measured, the area fraction of the core wire 11 was 33.8% for both Samples C and D. This confirmed that the difference in electrical conductivity between Sample C and Sample D was not due to a change in the area fraction of the core wire 11 in the cross section perpendicular to the longitudinal direction.

Next, for Samples C and D above, the thickness of the diffusion layer 11D, having the Fe content of 0.5 mass % or more, was measured by EPMA line analysis. Specifically, a field emission EPMA (JXA-8530F) manufactured by JEOL Ltd. was used to perform the line analysis near the interface between the core wire 11 and the coating layer 12 in the radial direction of the electrically conductive wire 1, under the conditions of: acceleration voltage of 15 kV, irradiation current of 100 nA, sampling time of 1 s, and probe diameter of 0.1 μm. The measurement results are shown in Table 4.

TABLE 4

|  | Diffusion Layer Thickness Adjustment | | Tensile | Electrical | |
|---|---|---|---|---|---|
|  | Temperature (° C.) | Time (sec) | Strength (MPa) | Conductivity (% IACS) | t/D$_1$ (%) |
| Sample C | 950 | 60 | 1513 | 31.8 | 2.04 |
| Sample D | 1030 | 600 | 1417 | 18.4 | 9.23 |

TABLE 4-continued

|  | Diffusion Layer Thickness Adjustment | | Tensile | Electrical | |
|---|---|---|---|---|---|
|  | Temperature (° C.) | Time (sec) | Strength (MPa) | Conductivity (% IACS) | t/D$_1$ (%) |
| Be—Cu | — | — | 1391 | 23.9 | — |

As shown in Table 4, it is confirmed that the decrease in electrical conductivity can be suppressed by reducing the thickness of the diffusion layer 11D by adjusting the conditions for the diffusion layer thickness adjustment. As a way of reducing the thickness of the diffusion layer 11D, it may be conceivable, for example, to interpose a Ni foil between the core wire 11 and the coating layer 12 to suppress diffusion. However, reducing the thickness of the diffusion layer 11D by adjusting the conditions for the diffusion layer thickness adjustment as described above can suppress the increase in the man-hour count and achieve high production efficiency.

Next, Samples G and H of the electrically conductive wire 1 obtained under different solution treatment conditions by carrying out up to the first solution treatment step S40 in the above embodiment, and the electrically conductive wires 1 of Samples C and D above that have undergone up to step S40 (both with the outer diameter D of 1.88 mm) were prepared, and the thickness of the layer (diffusion layer 11D) formed to include the surface of the core wire 11 and having the Fe content of 0.5 mass % or more was measured. The proportion t/D$_1$ of the thickness t of the diffusion layer with respect to the diameter D$_1$ of the core wire 11 was then calculated. Similarly, a thickness t$_{Ni}$ of the layer having the Ni content of 0.2 mass % or more was measured. The proportion t$_{Ni}$/D$_1$ of t$_{Ni}$ with respect to the diameter D$_1$ of the core wire 11 was then calculated. Further, t/D$_1$ and t$_{Ni}$/D$_1$ were calculated on the basis of the diffusion equation. The results are shown in Tables 5 and 6.

TABLE 5

|  | Solution Treatment | | Measured | Calculated |
|---|---|---|---|---|
|  | Temperature (° C.) | Time (sec) | Value of t/D$_1$ (%) | Value of t/D$_1$ (%) |
| Sample G | 1030 | 60 | 2.81 | 3.18 |
| Sample C | 950 | 60 | 2.04 | 1.80 |
| Sample D | 1030 | 600 | 9.23 | 8.36 |
| Sample H | 950 | 600 | 2.82 | 4.88 |

TABLE 6

|  | Solution Treatment | | Measured | Calculated |
|---|---|---|---|---|
|  | Temperature (° C.) | Time (sec) | Value of t$_{Ni}$/D$_1$ (%) | Value of t$_{Ni}$/D$_1$ (%) |
| Sample G | 1030 | 60 | 0.87 | 0.95 |
| Sample C | 950 | 60 | 0.87 | 0.42 |
| Sample D | 1030 | 600 | 5.63 | 2.52 |
| Sample H | 950 | 600 | 1.26 | 1.14 |

Referring to Tables 5 and 6, the thicknesses of the layer with Fe content of 0.5 mass % or more and the layer with Ni content of 0.2 mass % or more are generally consistent with the thicknesses of the diffusion layers calculated on the basis of the diffusion equation. This confirms that the layer with Fe content of 0.5 mass % or more and the layer with Ni content of 0.2 mass % or more are layers (diffusion layers) formed by diffusion of the elements.

Electrical conductivity was evaluated for Samples C, D, G and H above. Specifically, a 3540 mΩ Hitester manufactured by Hioki E.E. Corporation was used to measure a resistance value between two points 150 mm apart, and the electrical conductivity was calculated from the obtained resistance value. Further, a calculated value of electrical conductivity in the case where the core wire 11 was considered to become thinner by the thickness of the diffusion layer 11D was obtained. The results are shown in Table 7.

TABLE 7

| | Solution Treatment | | Measured Value of Electrical | Calculated Value of Electrical |
|---|---|---|---|---|
| | Temperature (° C.) | Time (sec) | Conductivity (% IACS) | Conductivity (% IACS) |
| Sample G | 1030 | 60 | 31.2 | 30.6 |
| Sample C | 950 | 60 | 32.1 | 30.9 |
| Sample D | 1030 | 600 | 28.5 | 27.5 |
| Sample H | 950 | 600 | 27.5 | 29.6 |

Referring to Table 7, the measured values of electrical conductivity are generally consistent with the calculated values of the electrical conductivity. This confirms that the diffusion layer 11D does not function as a conductive region. It can then be said that adjusting the conditions of the solution treatment can suppress the formation of the diffusion layer and reduce the decrease in electrical conductivity.

(3) Verification of Superiority Over Be—Cu

Samples J to N with different tensile strength and electrical conductivity were prepared, in accordance with the production method in the above embodiment, by changing the area fraction of the core wire 11 in the cross section perpendicular to the longitudinal direction and the conditions for the diffusion layer thickness adjustment. For each of the obtained samples and for Sample C above, the tensile strength, the electrical conductivity, and the percentage of the thickness of the diffusion layer ($t/D_1$) were examined. The relationship between tensile strength and electrical conductivity was then compared with that of Be—Cu. The results are shown in Table 8 and in FIG. 4.

TABLE 8

| | Tensile Strength (MPa) | Electrical Conductivity (% IACS) | $t/D_1$ (%) |
|---|---|---|---|
| Sample C | 1513 | 31.8 | 2.04 |
| Sample J | 1175 | 51.0 | 2.03 |
| Sample K | 978 | 60.2 | 2.04 |
| Sample L | 1516 | 34.2 | 0.4 |
| Sample M | 1180 | 54.5 | 0.4 |
| Sample N | 985 | 64.1 | 0.4 |

Figure 4:
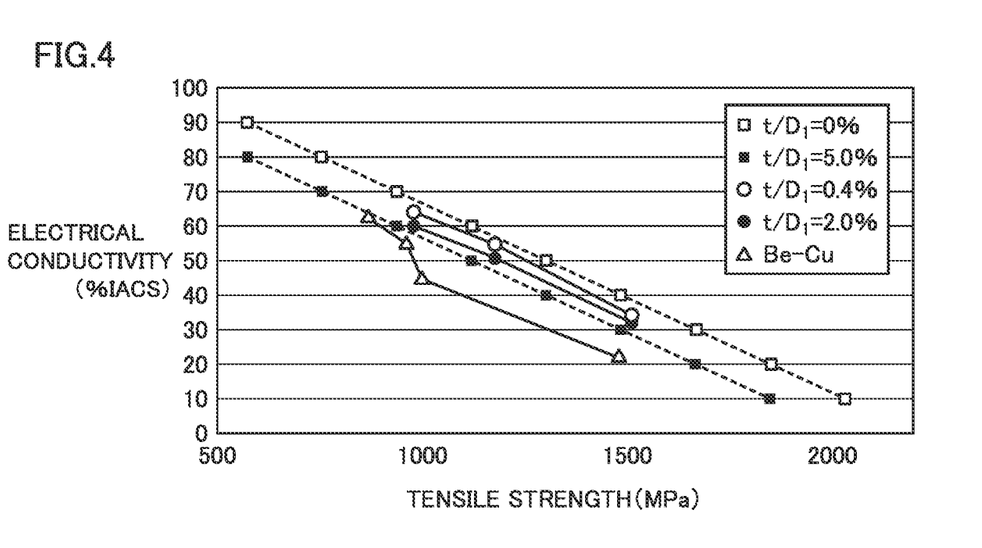
FIG. 4 shows the relationship between tensile strength and electrical conductivity.

In FIG. 4, the horizontal axis corresponds to tensile strength and the vertical axis corresponds to electrical conductivity. In FIG. 4, the relationship between tensile strength and electrical conductivity of Be—Cu is shown together for comparison (hollow triangles). Also shown together in FIG. 4 are the calculated values for the cases where $t/D_1$ is 0% and 5% (hollow and solid quadrangles).

As the percentage of the cross section of the core wire 11 in the cross section of the electrically conductive wire 1 perpendicular to the longitudinal direction increases, the electrical conductivity increases and the tensile strength decreases. Conversely, as the percentage of the cross section of the core wire 11 decreases, the electrical conductivity decreases and the tensile strength increases. In FIG. 4, the calculated values for the case where $t/D_1$ is 5% are displayed in the range where the percentage of the cross section of the core wire 11 is 10% to 90% (solid quadrangles). As shown in FIG. 4, in the range where the percentage of the cross section of the core wire 11 is 10% to 90%, the electrically conductive wires of the present disclosure with $t/D_1$ of 5% or less have electrical conductivity that exceeds that of Be—Cu with the same tensile strength. In all of Samples C and J to N, which are examples of the electrically conductive wire of the present disclosure, the electrical conductivity exceeding that of Be—Cu with the same tensile strength has been measured. These results confirm the superiority of the electrically conductive wires of the present disclosure over Be—Cu from the standpoint of the relationship between tensile strength and electrical conductivity.

(4) Summary of Experimental Results Concerning Electrically Conductive Wires Having Copper Core Wire From the above experimental results, it can be said that the value of $t/D_1$ is required to be 0.4% or more from the standpoint of improving durability against repeated bending fatigue. On the other hand, the value of $t/D_1$ is required to be 5% or less from the standpoint of securing an electrical conductivity higher than that of Be—Cu with the same tensile strength. It is confirmed that the electrically conductive wire with the value of t/D set to be not less than 0.4% and not more than 5% can provide an electrically conductive wire that exhibits higher strength than Be—Cu, while securing electrical conductivity comparable to that of Be—Cu, and excellent durability against repeated bending fatigue.

(5) Verification of Core Wire Materials Other than Copper

Electrically conductive wires adopting the austenitic stainless steel, JIS SUS316, as the stainless steel constituting the coating layer 12 and materials other than Cu as the material constituting the core wire 11 were produced for trial. The durability against repeated bending fatigue was evaluated in the same manner as in (1) above. The experimental results are shown in Table 9.

TABLE 9

| | Coating Layer Material | Core Wire Material | $t/D_1$ (%) | Number of Times of Endurance (×10³ times) | Judgment |
|---|---|---|---|---|---|
| Sample O | SUS316 | Cu | 0.4 | 850 | Acceptable |
| Sample P | SUS316 | Au | 0.4 | 740 | Acceptable |
| Sample Q | SUS316 | Cu—Zn | 0.41 | 1052 | Acceptable |
| Sample R | SUS316 | Al | 0.4 | 350 | Acceptable |
| Sample S | SUS316 | Cu-coated Ag | 0.41 | 440 | Acceptable |

Referring to Table 9, it has been confirmed that setting the value of $t/D_1$ to 0.4% or more makes it possible to obtain excellent durability against repeated bending fatigue, as in the case of adopting Cu as the material of the core wire 11. It should be noted that the electrical conductivity becoming insufficient with the value of $t/D_1$ exceeding 5% is considered to be true irrespective of the material used for the core wire 11. From the above results of the trial production, it is confirmed that even when a material other than copper is used as the material of the core wire, the electrically conductive wires of the present disclosure can provide an electrically conductive wire that has high strength, while securing high electrical conductivity, and excellent durability against repeated bending fatigue.

It should be noted that the adhesion between the core wire 11 and the coating layer 12 for obtaining excellent durability against repeated bending fatigue is achieved by the diffusion of Fe, the main component of the stainless steel. Therefore, although the component composition of the stainless steel constituting the coating layer 12 is not particularly limited, it is preferable from the standpoint of workability to adopt an austenitic stainless steel for the stainless steel constituting the coating layer 12.

(6) Evaluation of Sag Resistance

Experiments were conducted to confirm that the formation of the diffusion layer improves the settling resistance. Electrically conductive wires 1 with the outer diameter D of 0.3 mm were prepared using the production method described in the above embodiment, and a high temperature coil spring settling test was conducted to evaluate the settling resistance to torsional stress. The heating temperature and heating time in step S70 were varied to prepare samples with varying thicknesses t of the diffusion layer 11D relative to the diameter $D_1$ of the core wire 11. For comparison, a Be—Cu wire with the outer diameter D of 0.3 mm was also prepared. These wires were then formed into a coil spring with a mean coil diameter of 3.2 mm and a pitch of 0.36 mm. The coil springs were subjected to torsional stress in a nitrogen atmosphere at 200° C. so as to achieve shear stress corresponding to 80% of the 0.2% proof stress, and the amount of residual strain after being held for 100 hours was measured. Here, the residual strain amount is a value obtained by dividing the change in spring length before and after the test by the spring length before the test. One with the residual strain amount smaller than that of Be—Cu was judged to be acceptable. The experimental results are shown in Table 10.

TABLE 10

| | Diffusion Layer Thickness Adjustment | | | Residual Strain | |
|---|---|---|---|---|---|
| | Temperature (° C.) | Time (sec) | $t/D_1$ (%) | Amount (%) | Judgment |
| Sample A | 850 | 6 | 0.36 | 29.4 | Unacceptable |
| Sample B' | 800 | 20 | 0.38 | 15.0 | Acceptable |
| Sample C | 950 | 60 | 2.04 | 13.4 | Acceptable |
| Sample D | 1030 | 600 | 9.23 | 14.7 | Acceptable |
| Be—Cu | — | — | — | 28.7 | — |

Referring to Table 10, Samples B', C, and D are acceptable for settling resistance to torsional stress, while Sample A is unacceptable. This is conceivably attributable to the small value of $t/D_1$, i.e., the small thickness of the diffusion layer in Sample A. Specifically, the small thickness of the diffusion layer caused insufficient bonding between the core wire and the coating layer, making the loaded strain concentrated in the coating layer, resulting in increased deformation of the coating layer, which is considered to have reduced the settling resistance to torsional stress.

Next, a high temperature bending settling test was conducted to evaluate the settling resistance to bending stress. As in the case of the evaluation of settling resistance to torsional stress described above, samples with varying thicknesses t of the diffusion layer 11D relative to the diameter $D_1$ of the core wire 11 were prepared by varying the heating temperature and heating time in step S70. For comparison, a Be—Cu wire with the outer diameter D of 0.3 mm was also prepared. These wires were made into a ring shape with a diameter of 100 mm and both ends were fixed. The wires were deformed such that a bending stress corresponding to 80% of the 0.2% proof stress would be loaded on a surface of the wire at a portion farthest from the fixed portion, and held in a nitrogen atmosphere at 200° C. After a lapse of 100 hours, the stress was unloaded and the residual strain amount was measured. Here, the residual strain amount is a value obtained by dividing the radius of curvature after the test by the radius of curvature before the test (50 mm). One with the residual strain amount smaller than that of Be—Cu was evaluated as A, comparable to that of Be—Cu as B, and larger than that of Be—Cu as C. The experimental results are shown in Table 11.

TABLE 11

| | Diffusion Layer Thickness Adjustment | | | Residual Strain | |
|---|---|---|---|---|---|
| | Temperature (°° C.) | Time (sec) | $t/D_1$ (%) | Amount (%) | Judgment |
| Sample A | 850 | 6 | 0.36 | 16.2 | C |
| Sample B' | 800 | 20 | 0.38 | 15.0 | B |
| Sample B" | 800 | 30 | 0.85 | 7.9 | A |
| Sample C | 950 | 60 | 2.04 | 6.6 | A |
| Sample D | 1030 | 600 | 9.23 | 7.3 | A |
| Be—Cu | — | — | — | 15.2 | — |

Referring to Table 11, the residual strain amount in Sample A is larger than that of Be—Cu and the residual strain amount in Sample B' is comparable to that of Be—Cu. These are conceivably attributable to the small value of $t/D_1$, i.e., the small thickness of the diffusion layer in Samples A and B'. Specifically, the small thickness of the diffusion layer caused insufficient bonding between the core wire and the coating layer, making the loaded strain concentrated in the coating layer, resulting in increased deformation of the coating layer, which is considered to have reduced the settling resistance to bending stress.

In contrast, in Samples B", C, and D with the value of $t/D_1$ of 0.85 or higher, the residual strain amount is considerably reduced and takes a value clearly smaller than that of Be—Cu. From the above experimental results, it can be said that a value of $t/D_1$ of 0.85 or higher is preferable from the standpoint of improving settling resistance.

(7) Verification of Sag Resistance for Core Wire Materials Other than Copper

Electrically conductive wires adopting the austenitic stainless steel, JIS SUS316, as the stainless steel constituting the coating layer 12 and materials other than Cu as the material constituting the core wire 11 were produced for trial. The settling resistance was then evaluated in the same manner as in (6) above. The experimental results are shown in Tables 12 and 13.

TABLE 12

| | Coating Layer Material | Core Wire Material | $t/D_1$ (%) | Residual Strain Amount (%) | Judgment |
|---|---|---|---|---|---|
| Sample a | SUS316 | Cu | 0.38 | 13.8 | Acceptable |
| Sample b | SUS316 | Au | 0.38 | 15.0 | Acceptable |
| Sample c | SUS316 | Cu—Zn | 0.41 | 13.2 | Acceptable |
| Sample d | SUS316 | Al | 0.38 | 14.2 | Acceptable |

TABLE 12-continued

|  | Coating Layer Material | Core Wire Material | t/D$_1$ (%) | Residual Strain Amount (%) | Judgment |
|---|---|---|---|---|---|
| Sample e | SUS316 | Cu-coated Ag | 0.41 | 14.4 | Acceptable |

TABLE 13

|  | Coating Layer Material | Core Wire Material | t/D$_1$ (%) | Residual Strain Amount (%) | Judgment |
|---|---|---|---|---|---|
| Sample f | SUS316 | Cu | 0.85 | 6.9 | A |
| Sample g | SUS316 | Au | 0.87 | 7.5 | A |
| Sample h | SUS316 | Cu—Zn | 0.86 | 6.3 | A |
| Sample i | SUS316 | Al | 0.90 | 7.1 | A |
| Sample j | SUS316 | Cu-coated Ag | 0.85 | 7.2 | A |

Referring to Tables 12 and 13, it is confirmed that by setting the value of t/D$_1$ to 0.85% or more, the settling resistance is improved as in the case where Cu is adopted as the material of the core wire 11.

(8) Effect of Amount of Change in Modulus of Elasticity on Durability

The effect of the amount of change in modulus of elasticity in the direction perpendicular to the interface between the core wire and the coating layer on durability was evaluated. Specifically, the modulus of elasticity was measured at intervals of 0.5 μm across the interface in the direction perpendicular to the interface. For measuring the modulus of elasticity, Hysitron TI 980 TriboIndenter manufactured by Bruker Corporation was used. For the indenter, a Berkovich indenter was adopted. A maximum value of the change in modulus of elasticity at adjacent measurement points (maximum absolute value of the difference in modulus of elasticity) was calculated. This value was compared with the results of (1) repeated bending fatigue test, (2) measurement of electrical conductivity, and (6) high temperature bending settling test described above, to examine the effect of the maximum value of the change in modulus of elasticity on durability. The experimental results are shown in Table 14.

TABLE 14

|  | Diffusion Layer Thickness Adjustment | | Maximum Change in Modulus of Elasticity (GPa) | Number of Times of Endurance (×10³ times) | Residual Strain Amount (%) | Electrical Conductivity (% IACS) |
|---|---|---|---|---|---|---|
|  | Temperature (° C.) | Time (sec) | | | | |
| Sample B' | 800 | 20 | 17030 | 70 | 15.0 | 32.1 |
| Sample B | 800 | 23 | 16250 | 222 | 7.9 | 31.1 |
| Sample C | 950 | 60 | 4905 | 850 | 6.6 | 31.8 |
| Sample D | 1030 | 600 | 1440 | 500 | 7.3 | 18.4 |

Referring to Table 14, it is confirmed that both durability against repeated bending fatigue and settling resistance are superior in the samples for which the maximum value of the change in modulus of elasticity is small. Specifically, when the maximum value of the change in modulus of elasticity is 16250 GPa or less, the durability against repeated bending fatigue and the settling resistance are both clearly increased. From this, it can be said that the maximum value of the change in modulus of elasticity is preferably 16250 GPa or less. This is conceivably because the change in modulus of elasticity in the vicinity of the interface between the core wire and the coating layer is moderate, so when deformation occurs near the interface due to externally applied load, the deformation is not concentrated in only one of the core wire and the coating layer. On the other hand, although sufficient diffusion progressing near the interface provides a gradual change in modulus of elasticity, if the diffusion progresses excessively and the maximum value of the change in modulus of elasticity becomes less than 1500 GPa, the electrical conductivity decreases (see Sample D). Therefore, it can be said that the maximum value of the change in modulus of elasticity is preferably set to be 1500 GPa or higher.

It should be understood that the embodiment and examples disclosed herein are illustrative and non-restrictive in every respect. The scope of the present invention is defined by the terms of the claims, rather than the description above, and is intended to include any modifications within the scope and meaning equivalent to the terms of the claims.

REFERENCE SIGNS LIST

1: electrically conductive wire; 11: core wire; 11A: surface; 11D: diffusion layer; 12: coating layer; D: outer diameter; D$_1$: diameter; t: thickness; and t$_{Ni}$: thickness.

The invention claimed is:

1. An electrically conductive wire comprising:
a core wire made of metal; and
a coating layer made of stainless steel, the coating layer covering a surface of the core wire;
the metal constituting the core wire having an electrical conductivity greater than an electrical conductivity of the stainless steel,
the core wire including a diffusion layer containing not less than 0.5 mass % Fe, the diffusion layer being arranged to constitute the surface of the core wire,
the diffusion layer having a thickness that is not less than 0.4% and not more than 5% of a diameter of the core wire over the entire periphery, and wherein:
the core wire is composed of Cu,
the stainless steel is JIS SUS304, and
a maximum value of a change in modulus of elasticity in the case where the modulus of elasticity is measured in a cross section perpendicular to a longitudinal direction of the electrically conductive wire at intervals of 0.5 μm across an interface between the core wire and the coating layer in a direction perpendicular to the interface is not less than 1500 GPa and not more than 16250 GPa.

2. The electrically conductive wire according to claim 1, wherein the thickness of the diffusion layer is not less than 0.85% of the diameter of the core wire.

3. The electrically conductive wire according to claim 1, wherein
the core wire is further composed of at least one of Ag, Al, Cu alloy, Ag alloy, and Al alloy.

4. An electrically conductive wire comprising:
a core wire made of metal; and
a coating layer made of stainless steel, the coating layer covering a surface of the core wire;
the metal constituting the core wire having an electrical conductivity greater than an electrical conductivity of the stainless steel,
the core wire including a diffusion layer containing not less than 0.5 mass % Fe, the diffusion layer being arranged to constitute the surface of the core wire,
the diffusion layer having a thickness that is not less than 0.4% and not more than 5% of a diameter of the core wire over the entire periphery,
the core wire being composed of Cu,
the stainless steel being an austenitic stainless steel,
a maximum value of a change in modulus of elasticity in the case where the modulus of elasticity is measured in a cross section perpendicular to a longitudinal direction of the electrically conductive wire at intervals of 0.5 μm across an interface between the core wire and the coating layer in a direction perpendicular to the interface is not less than 1500 GPa and not more than 16250 GPa.

* * * * *